Jan. 29, 1974   R. J. MINER ET AL   3,788,829
METHOD FOR MAKING GLASSWARE
Original Filed Nov. 25, 1968   8 Sheets-Sheet 1

INVENTORS
ROBERT J. MINER
BY HARRY W. MEEK
Richard B. Dence
E. J. Holler
ATTORNEYS Jan. 29, 1974 R. J. MINER ET AL 3,788,829

METHOD FOR MAKING GLASSWARE

Original Filed Nov. 25, 1968 8 Sheets-Sheet 2

FIG. 6

INVENTORS
ROBERT J. MINER
BY HARRY W. MEEK
Richard B. Pence
E. J. Holler
ATTORNEYS

Jan. 29, 1974  R. J. MINER ET AL  3,788,829
METHOD FOR MAKING GLASSWARE
Original Filed Nov. 25, 1968  8 Sheets-Sheet 6

INVENTORS
ROBERT J. MINER
BY HARRY W. MEEK
Richard B. Dence
E. J. Holler
ATTORNEYS

United States Patent Office 3,788,829
Patented Jan. 29, 1974

3,788,829
METHOD FOR MAKING GLASSWARE
Robert J. Miner and Harry W. Meek, Toledo, Ohio, assignors to Owens-Illinois, Inc.
Continuation of appplication Ser. No. 137,081, Apr. 23, 1971, which is a continuation of application Ser. No. 778,645, Nov. 25, 1968, both now abandoned. This application Nov. 20, 1972, Ser. No. 307,810
Int. Cl. C03b 9/00
U.S. Cl. 65—79                                8 Claims

ABSTRACT OF THE DISCLOSURE

A method and apparatus for making glassware wherein a charge of glass is delivered to a parison mold, pressed in the parison mold, transferred to a blow mold, and a body portion is blown in the blow mold while a heavier base portion is pressed in the blow mold. In this process, an elongated charge is transferred to the blow mold after which the heavy end of the charge sags downwardly through the restricted portion of the mold but does not appreciably accumulate on the bottom plate before blowing.

---

This invention relates to forming glassware and particularly to forming glassware having a heavy base portion or stem portion.

This is a continuation of application Ser. No. 137,081, filed Apr. 23, 1971 which is, in turn, a continuation of application Ser. No. 778,645, filed Nov. 25, 1968, both now abandoned.

BACKGROUND OF THE INVENTION

In the making of hollow glass articles, such as stemware, it is common to form the hollow bowl portion of the glass article on a machine commonly known as a Westlake machine, such as shown in the patent to Kadow 1,527,556. A separately formed stem or foot is then joined to the hollow body portion that has been made.

It has heretofore been suggested, as shown in the expired patent to Schutz 1,972,717, that a heavy base glass article can be formed by first blowing the body portion and base and thereafter pressing the base to squeeze a portion of the glass that has been blown into a foot. Such a method has not proven commercially satisfactory and one of the reasons may well be that it involves the elimination of an air pocket from a previously formed portion of glass in the base of the article.

In the making of heavy base glass articles, where the base has a configuration other than a surface of revolution, the articles have been previously made in a two section mold by pressing and blowing. Such articles have the disadvantage in that the seam marks of the mold may be visible in the final article.

Among the objects of the invention are to provide a method and apparatus for forming heavy base and stemware in one piece; wherein the article has a surface without seam marks; and wherein the base of the article may have a complex configuration.

DESCRIPTION

Figure 1:
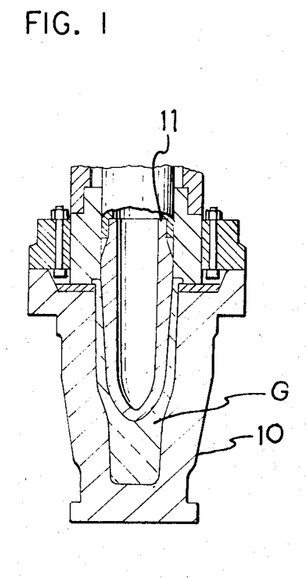
FIGS. 1–5 are partly diagrammatic sectional views showing the formation of glass articles in accordance with the invention at the various stages of the method.
Figure 2:
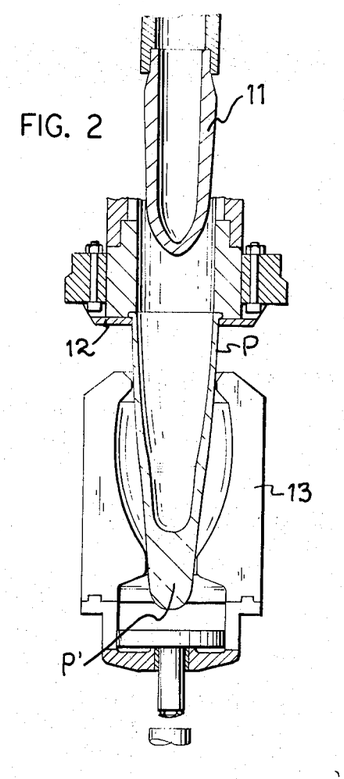
Figure 3:
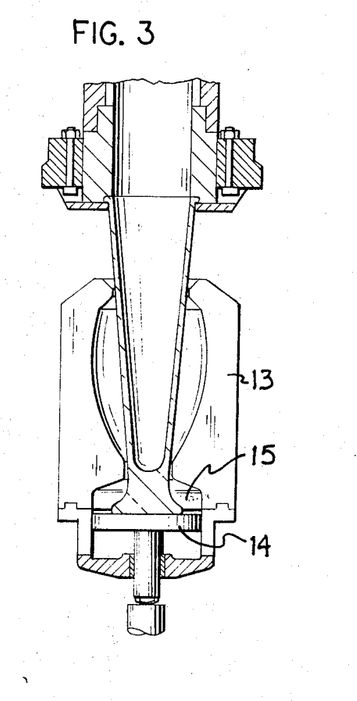
Figure 4:
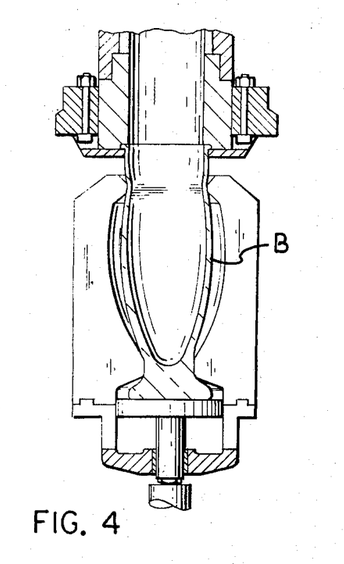

Referring to FIGS. 1–5, a glass article, such as a footed tumbler, is formed in accordance with the invention by feeding a gob or charge of glass G in a viscous form to a blank or parison mold 10 and pressing the charge by a plunger 11 to shape the charge and force a portion of the charge into position for grasping a spindle or neck ring 12. As shown in FIG. 2, the parison includes a heavy end portion P'. The plunger 11 is then withdrawn and the shaped parison P is transferred by the neck ring 12 to a blow mold 13. The sections of the blow mold 13 are closed about the parison P. During this time, the parison becomes elongated due to the heavy portion P' at the base of the parison.

The parison is then rotated and air is introduced into the parison to force the upper portion of the parison P against the side walls of the blow mold 13. At the same time, a bottom plate 14 is moved upwardly to shape the heavy portion P' against the surface 15 of the parison mold into the form of a heavy foot. As can be seen in FIGS. 2–5, there is no appreciable accumulation of glass on the bottom plate 14 before the bottom plate 14 is moved upwardly and the heavy end portion P' has sufficient glass to form the constricted portion and heavy base when the bottom plate 14 is moved upwardly The final article thus has a bowl B, a heavy foot F, and an upper moil portion M. The article is then transferred to a separate apparatus wherein the moil M is severed as by burning off to produce the final article.

The apparatus for performing the aforementioned method is similar in basic structure to that shown and described in the patent to Rowe 1,979,211 and differs therefrom in the shape of the final blow molds 13 and the structure and operation of the bottom plate 14.

Figure 7:
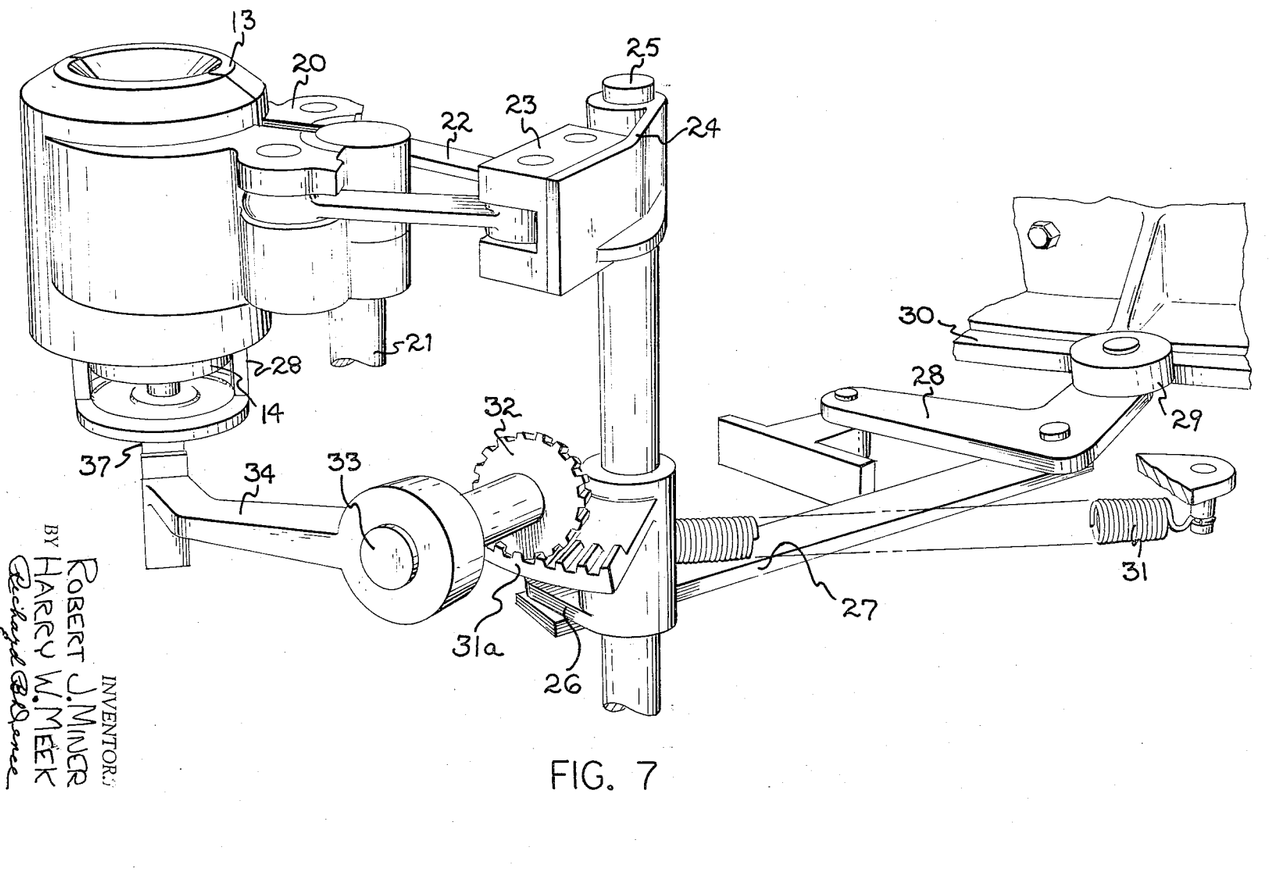
FIGS. 7 and 8 are fragmentary perspective views showing the apparatus in various phases of operation.
Figure 8:
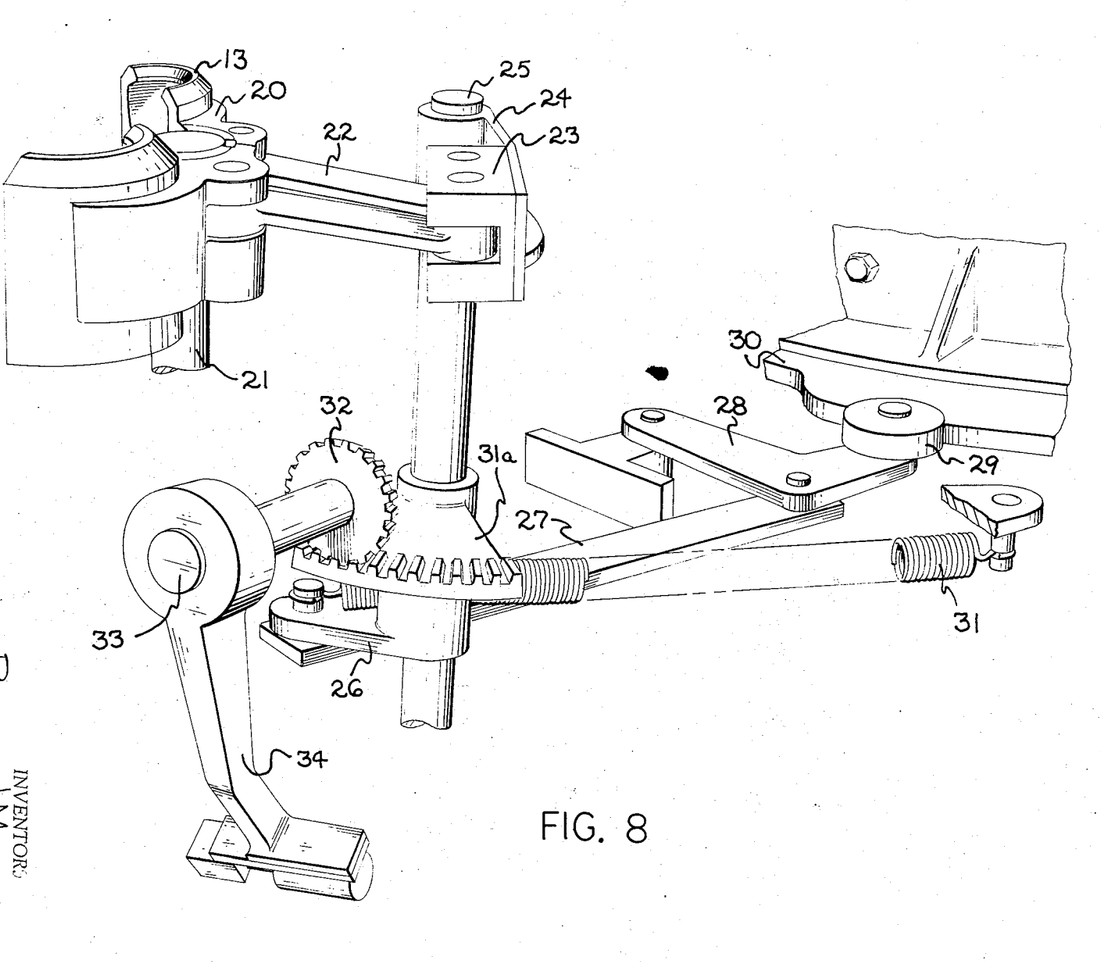

Referring to FIGS. 7 and 8, the blow molds 13 are supported on a rotary table by mold carriers 20 pivoted on a shaft 21. The mold carriers are pivoted to open and close the molds by links 22 extending to a head 23 mounted on the outer end of an arm 24 which is secured to the upper end of a shaft 25. Shaft 25 has an arm 26 fixed thereon which is connected by a link 27 to a rocker member 28. Rocker member 28 is pivoted to a rotary portion of the machine and supports a cam follower roller 29 which engages a fixed circular cam 30 on the machine. As the machine rotates, the roller 29 follows the cam 30 to move the cam roller inwardly and outwardly and, in turn, to oscillate the shaft 25 to open and close the mold 13. A spring 31 is fixed to arms 26 and yieldingly urges the cam follower roller 29 against the cam 30. Also fixed to the shaft 25 is a rack 31a. A gear 32 is meshed with the rack 31a and is adapted to be oscillated by the rack 31a to oscillate a shaft 33 on which a bottom plate actuating arm 34 is fixed.

Figure 11:
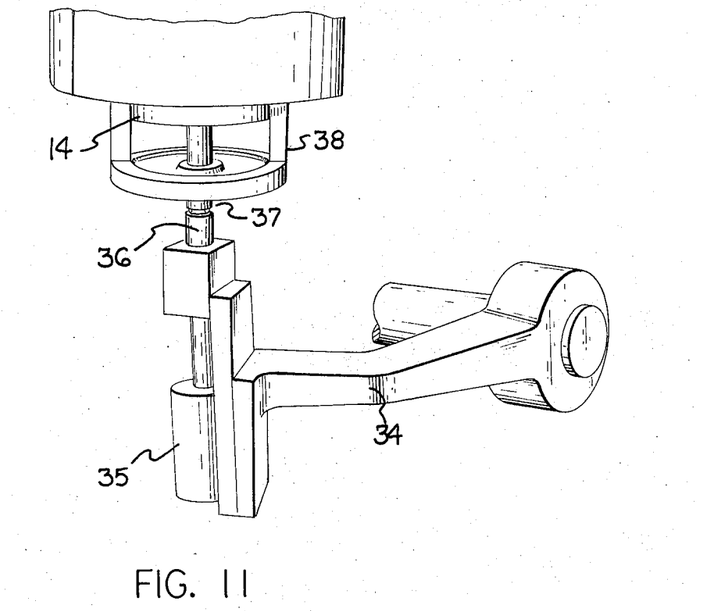
FIG. 11 is a fragmentary perspective view of another portion of the apparatus.

As best shown in FIG. 11, the bottom plate actuating arm 34 supports an air cylinder 35, the piston 36 of which may be extended, and is adapted to engage a downwardly projection portion 37 on the bottom plate 14 to move the bottom plate 14 upwardly.

Figure 9:
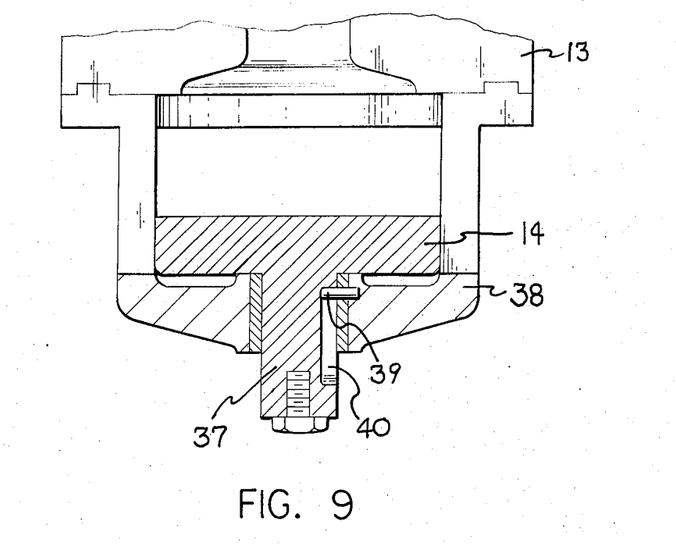
FIG. 9 is a fragmentary vertical sectional view of a portion of the apparatus.
Figure 10:
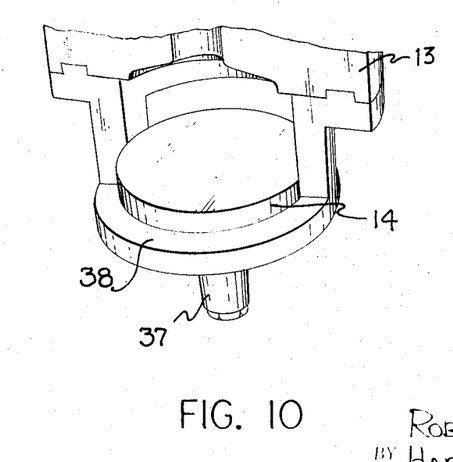
FIG. 10 is a fragmentary perspective view of a portion of the apparatus.

As shown in FIG. 9, the bottom plate 14 is mounted for vertical movement in a guide assembly 38 and may be fixed against rotation by a pin 39 extending into a slot 40 in the downwardly projecting portion 37.

When it is desired to make glass articles having a complex base configuration which is not a surface or revolution, the bottom plate is replaced with a bottom plate of the desired configuration which is also free to rotate.

Figure 12:
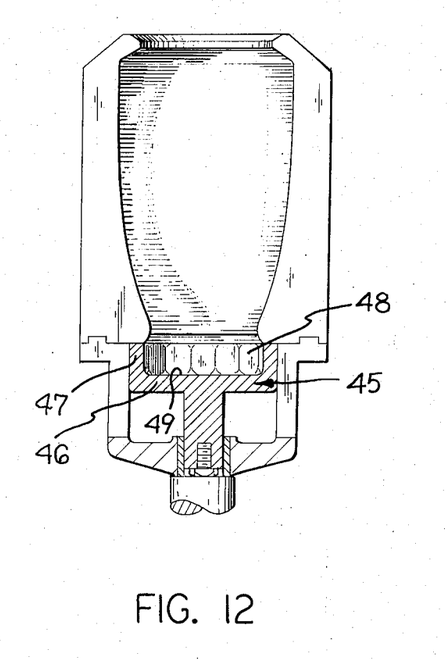
FIG. 12 is a fragmentary vertical sectional view of a modified form of a portion of the apparatus.
Figure 13:
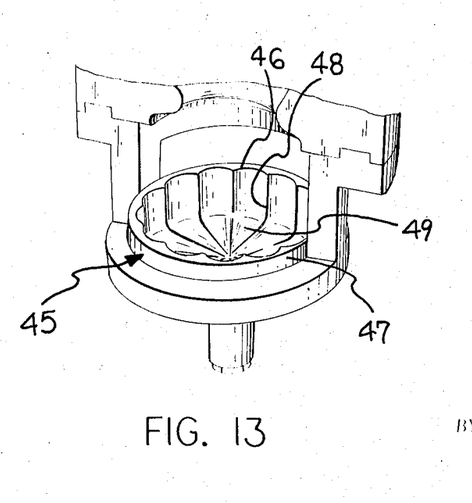
FIG. 13 is a fragmentary perspective view of a portion of the apparatus shown in FIG. 12, parts being broken away.

Thus, as shown in FIGS. 12 and 13, when the parison is rotated within the blow mold and air is supplied thereto and the bottom plate 45 is moved upwardly, the bottom plate 45 is free to rotate with the parison to produce the final article.

Figure 5:
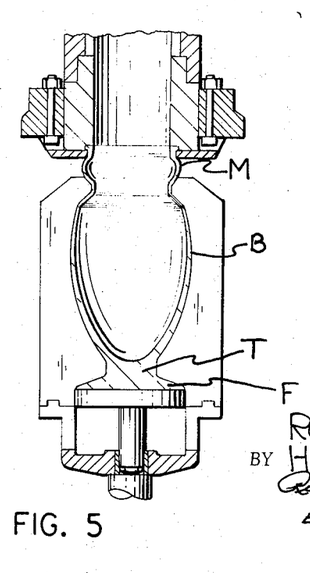
Figure 6:
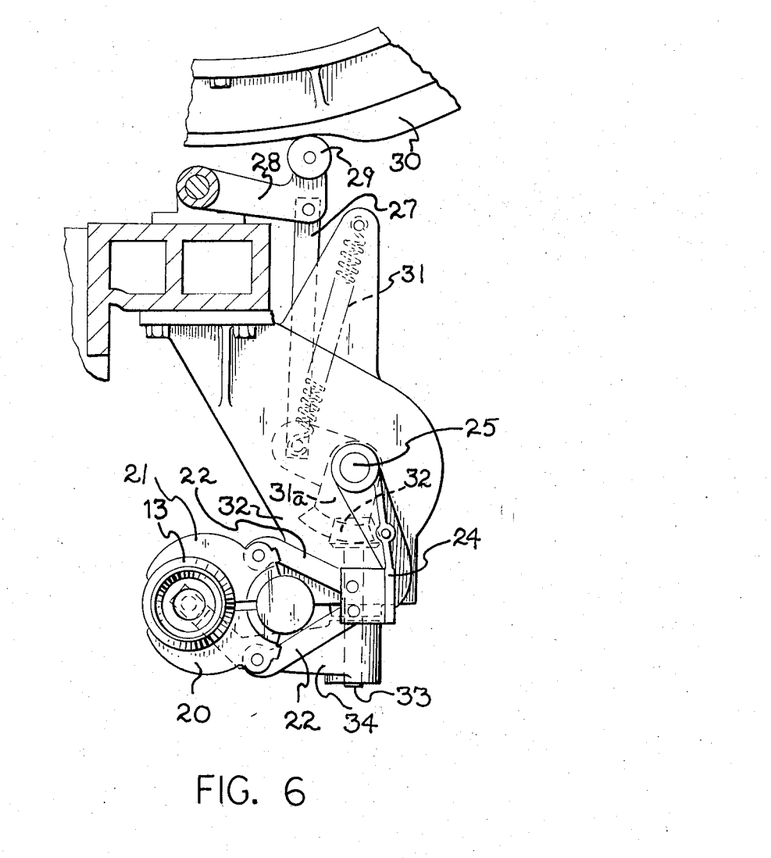
FIG. 6 is a fragmentary sectional view of an apparatus embodying the invention.

Specifically, as shown in FIG. 13, the bottom plate 45 comprises a horizontal base 46 and an upwardly extending flange 47, the glass engaging portions of which have the desired configuration, such as flutes 48, depressions 49, or other formations.

Where it is desired to make articles of stemware having an elongated stem connecting the base and body or bowl portion, the glass article, such as shown in FIG. 5, is transferred to a station wherein the bowl and base portions are moved axially relative to one another to stretch the thickened intermediate portion T to form an elongate stem. Such an elongating apparatus is shown in FIGS. 14 and 15.

Figure 14:
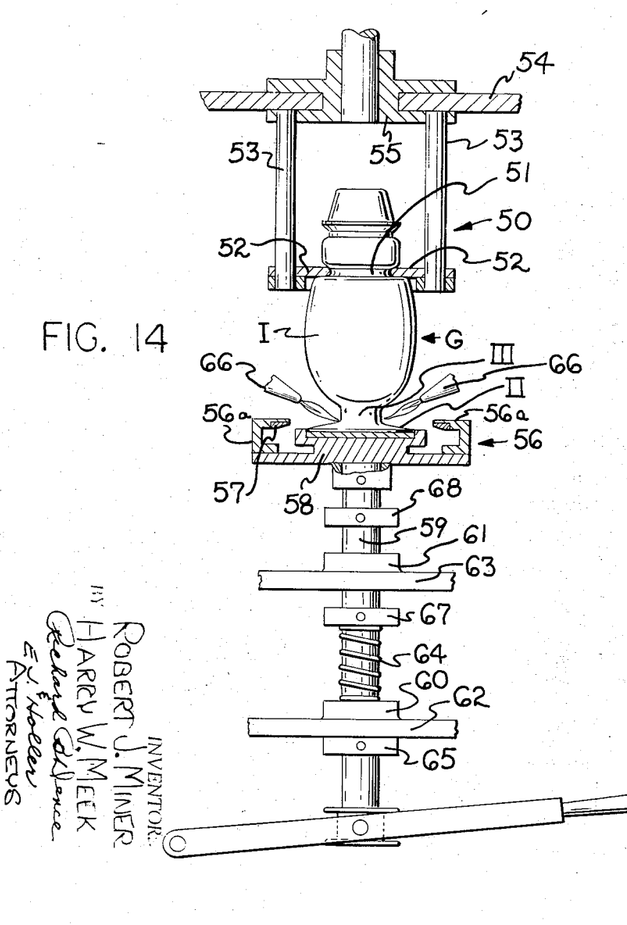
FIGS. 14 and 15 are fragmentary vertical sectional views of another apparatus showing the parts in different operative positions.
Figure 15:
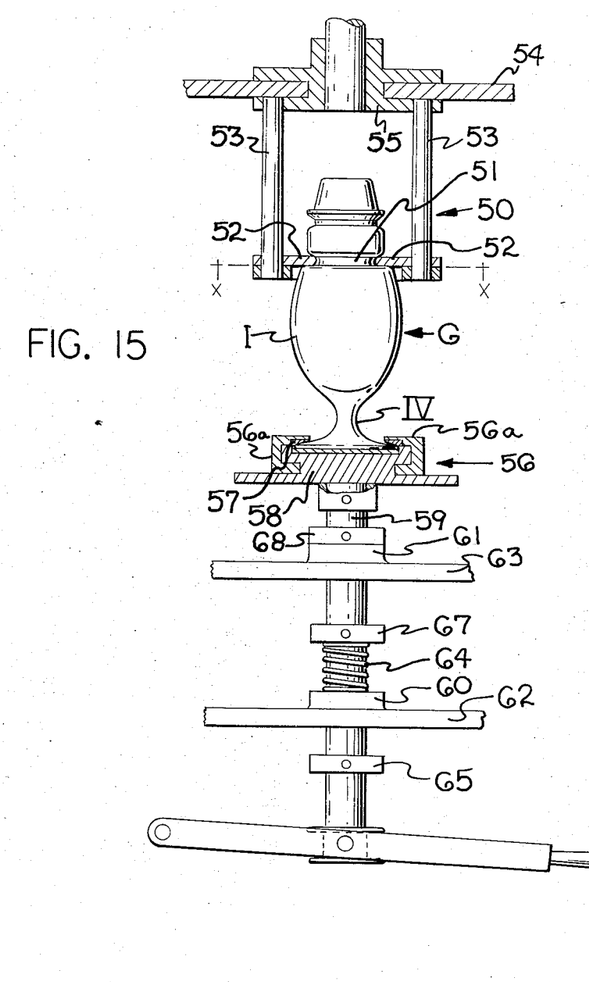

Referring to FIGS. 14 and 15, the elongating apparatus comprises a supporting yoke 50, which receives and supports the part-formed article G in the state in which its bowl portion I and base portion II have set, but the constricted neck portion III (FIG. 14), which is thicker and shorter than the stem portion IV (FIG. 15) required in the finished article, has not fully set or at least is still sufficiently hot to be rendered workable by a relatively small amount of heating. The yoke 50, which at least partly embraces the bowl portion of the part-formed article, supports the latter by engaging in a circumferential groove 51, which is formed during the production of the bowl portion I, at a position above the final burn-off line X—X, by appropriately shaping the inside of the mold in which the bowl portion I is formed.

The yoke 50 may comprise a pair of jaws 52 which close round the article (being shown closed in FIGS. 14 and 15) and are shaped to conform to the part of the article which they engage, these jaws being made of a heat insulating material.

The yoke 50 is carried by a structure comprising support rods 53 depending from a rotatable ring 54 which is itself rotatably supported by a fixed support plate 55. Rotation of the ring 54, and with it of the yoke 50 and the article G, is effected by driving the ring 54 in any suitable manner.

The base II of the part-formed article, as received by the yoke 50, is gripped by means of a split clamping ring 56, the two parts 56a of which are seen in their open position in FIG. 14 and in their closed position in FIG. 15. Semi-annular grooves 57 on the ring parts 56a engage over the peripheral edge of the base portion II of the article G and clamp it to a platform 58. Heat insulation is provided between the article G on the one hand and the platform 58 and clamping ring 56 on the other hand.

The platform 58 is carried by a vertically movable rod 59 guided by bushings 60, 61 secured on respective fixed support plates 62, 63. A spring 64 urges the rod upwardly to bring the platform to a limiting upper position shown in FIG. 14 and determined by a stop collar 65 on the rod 59 coming into engagement with the underside of support plate 62.

Before closing the clamping ring 56, the neck portion III of the article G, taken in the state previously referred to, is preferably heated to render it more workable by subjecting it to the action of a ring or horseshoe of burners 66 while rotating it by driving the ring 54. The burners 66 are removed before closing the ring 56 (see FIG. 15) and the vertically movable rod 59 is then actuated to bring the platform 58 gently toward a limiting lower position (FIG. 15) determined by a stop collar 68 engaging the upper surface of support plate 63. Since the base II of the article G is clamped to the platform 58, this action produces an elongation of the neck portion III to form the required stem portion IV with a length determined by the position of the collar 67 along the rod 59. The platform 58 is held in its lower position until the stem IV has set, after which a final burn-off can be effected at the level X—X either before or after removing the article from the elongating apparatus.

We claim:

1. The method of making a hollow article having a hollow bowl and an intermediate constricted portion interconnecting the bowl to a heavy base, from a viscous heat-softened material which comprises both interiorly and exteriorly shaping a charge of the heat-softened material by pressing the charge with a plunger while within the confines of a cavity-type parison mold into an axially elongated parison having a substantially conically shaped hollow body portion merging integrally with an axially protruding heavy end portion at the apex end thereof, the size of the heavy end portion being sufficient to produce the constricted portion and heavy base, enclosing the parison within a finishing mold having the desired configuration of the final article including a hollow bowl shaping portion, an intermediate constricted portion, and an enlarged base forming portion including a bottom plate, permitting the parison to sag downwardly under the action of gravity without appreciably accumulating glass on the bottom plate at the heavy end portion of the parison, interiorly blowing the hollow body portion of the parison outwardly onto the bowl shaping portion and the intermediate constricted portion of the finishing mold, and applying an exterior axial force to the heavy end portion by moving the bottom plate to force the heavy axially protruding end portion of the parison into configurational conformity with the base forming portion of the finishing mold.

2. The method set forth in claim 1 including the step of rotating the parison during the steps of interiorly blowing and applying an exterior axial force.

3. The method set forth in claim 2 including the step of preventing rotation of the base plate of the finishing mold during the steps of interiorly blowing and applying an axial force.

4. The method set forth in claim 2 including the step of permitting rotation of the bottom plate during the steps of interiorly blowing and applying an axial force.

5. The method of making a hollow article having a hollow bowl and an intermediate constricted portion interconnecting the bowl to a heavy base, from a viscous heat-softened material which comprises moving a plurality of finishing molds in a predetermined path, each finishing mold having the desired configuration of the final article including a hollow bowl shaping portion, an intermediate constricted portion, and an enlarged base forming portion, both interiorly and exteriorly shaping successive charges of the heat-softened material by pressing each charge with a plunger while within the confines of a cavity-type parison mold into an axially elongated parison having a substantially conically shaped hollow body portion merging integrally with an axially protruding heavy end portion at the apex end thereof, the size of the heavy end portion being sufficient to produce the constricted portion and heavy base, enclosing each successive parison within a finishing mold having the desired configuration of the final article including a hollow bowl shaping portion, an intermediate constricted portion, and an enlarged base forming portion including a bottom plate, permitting the parison to sag downwardly under the action of gravity without appreciably accumulating glass at the heavy end portion of the parison, interiorly blowing the hollow body portion of the parison outwardly onto the bowl shaping portion and the intermediate constricted portion of the finishing mold while said finishing mold is moved in said predetermined path, and applying an exterior axial force to the heavy end portion by moving the bottom plate to force the heavy axially protruding end portion of the parison into configurational conformity with the base forming portion of the finishing mold while said finishing mold is moved in said predetermined path.

6. The method set forth in claim 5 including the step of rotating the parison during the steps of interiorly blowing and applying an exterior axial force.

7. The method set forth in claim 6 including the step of preventing rotation of the base plate of the finishing mold during the steps of interiorly blowing and applying an axial force.

8. The method set forth in claim 6 including the step of permitting rotation of the bottom plate during the steps of interiorly blowing and applying an axial force.

References Cited
UNITED STATES PATENTS

| | | | |
|---|---|---|---|
| 1,560,784 | 11/1925 | Hamilton | 65—Dig. 10 |
| 2,417,328 | 3/1947 | Sloan | 65—Dig. 10 |
| 3,071,946 | 1/1963 | Watson | 65—242 X |
| 3,130,030 | 4/1964 | Watson et al. | 65—79 |

ROBERT L. LINDSAY, JR., Primary Examiner

U.S. Cl. X.R.

65—82, 242; 425—387